US008943998B2

(12) United States Patent
Gano

(10) Patent No.: US 8,943,998 B2
(45) Date of Patent: Feb. 3, 2015

(54) METHOD AND APPARATUS FOR CLADDING AN INTERIOR SURFACE OF A CURVED PIPE

(76) Inventor: Don Gano, Sundre (CA)

( * ) Notice: Subject to any disclaimer, the term of this patent is extended or adjusted under 35 U.S.C. 154(b) by 1116 days.

(21) Appl. No.: 12/946,022

(22) Filed: Nov. 15, 2010

(65) Prior Publication Data

US 2012/0118230 A1    May 17, 2012

(51) Int. Cl.
| | |
|---|---|
| *B05B 13/06* | (2006.01) |
| *B05C 11/00* | (2006.01) |
| *B23K 9/04* | (2006.01) |

(52) U.S. Cl.
CPC ..................... *B23K 9/048* (2013.01)
USPC ........... 118/318; 118/306; 118/317; 118/712; 118/663; 451/11; 219/76.1

(58) Field of Classification Search
CPC ....................................... B05B 13/06
USPC .................. 118/306, 305, 317, 318, 712, 663; 219/76.1, 76.12, 76.13, 76.14, 60 R; 228/254, 38, 44.5; 427/230–239; 451/11, 21
See application file for complete search history.

(56) References Cited

U.S. PATENT DOCUMENTS

| | | | |
|---|---|---|---|
| 4,537,136 A * | 8/1985 | Douglas | 104/138.2 |
| 4,862,808 A * | 9/1989 | Hedgcoxe et al. | 104/138.2 |
| 5,014,901 A | 5/1991 | Moran | |
| 6,013,890 A | 1/2000 | Hulsizer | |
| 6,234,383 B1 | 5/2001 | Harmat et al. | |
| 6,548,783 B1 | 4/2003 | Kilovsky et al. | |
| 6,627,839 B1 | 9/2003 | Luckowski et al. | |
| 6,727,465 B1 | 4/2004 | Kislovsky et al. | |
| 6,781,083 B1 | 8/2004 | Keller et al. | |
| 6,858,813 B1 | 2/2005 | Keller et al. | |
| 7,028,882 B2 | 4/2006 | Kislovsky et al. | |

FOREIGN PATENT DOCUMENTS

WO    WO2009036545    3/2009

\* cited by examiner

*Primary Examiner* — Yewebdar Tadesse
(74) *Attorney, Agent, or Firm* — Maxey Law Offices, PLLC; Stephen Lewellyn

(57) ABSTRACT

An apparatus for cladding the interior surfaces of a curved pipe section includes a flexible track that is positioned longitudinally within the curved pipe and supported at opposite ends to corresponding opposite ends of the curved pipe. The flexible track is caused to bend and conform to the radius of curvature of an interior surface of the curved pipe. A robotic crawler is supported on the track section and carries a material applicator head. The robotic crawler is driven back-and-forth across the track section while the material applicator head applies an overlay material to the interior surface of the curved pipe. In a method, the position of the curved pipe in space, the travel direction and speed of the crawler and the position of the application head are all coordinated to maintain the application of the overlay material in the "flat plane" position.

8 Claims, 24 Drawing Sheets

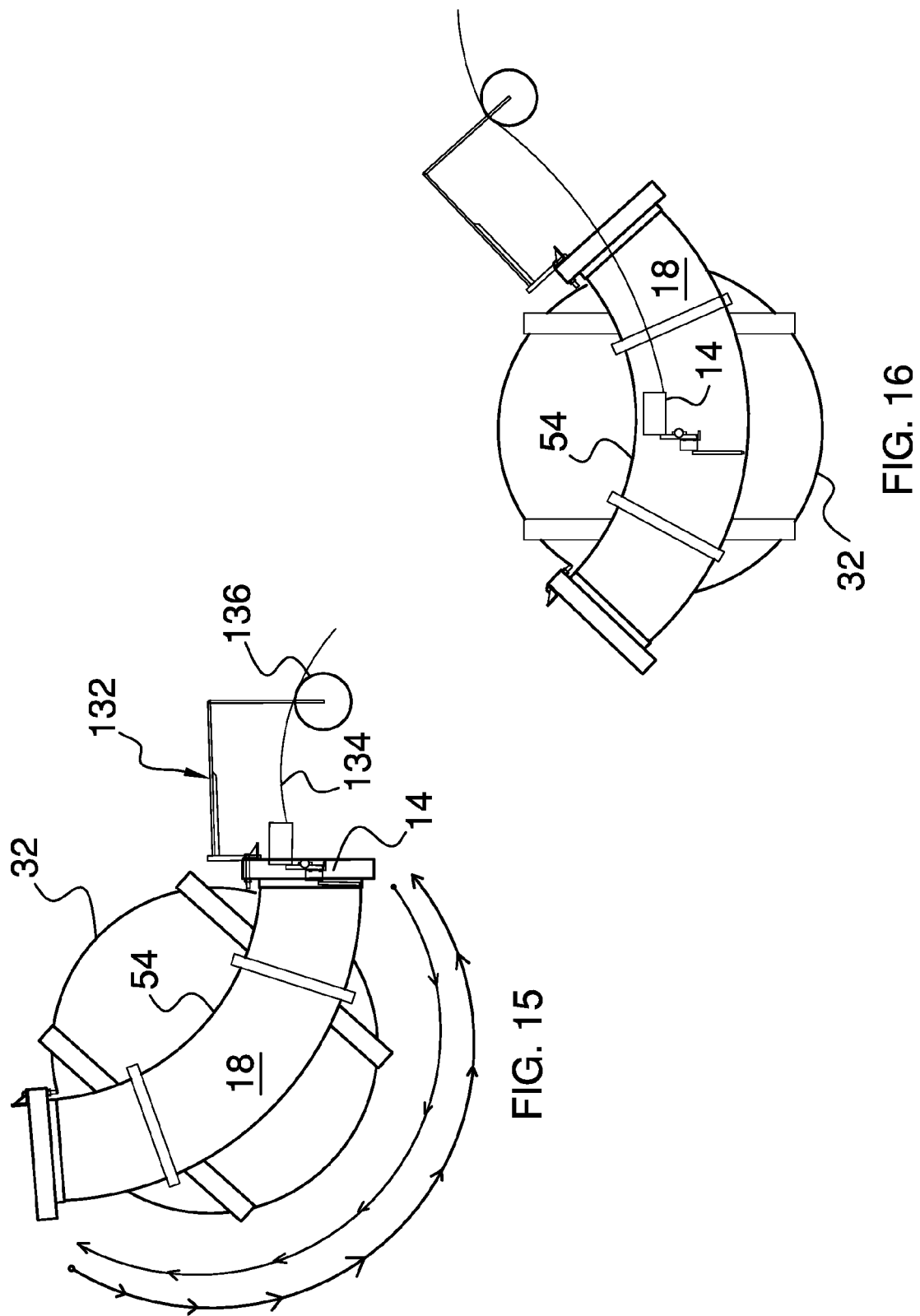

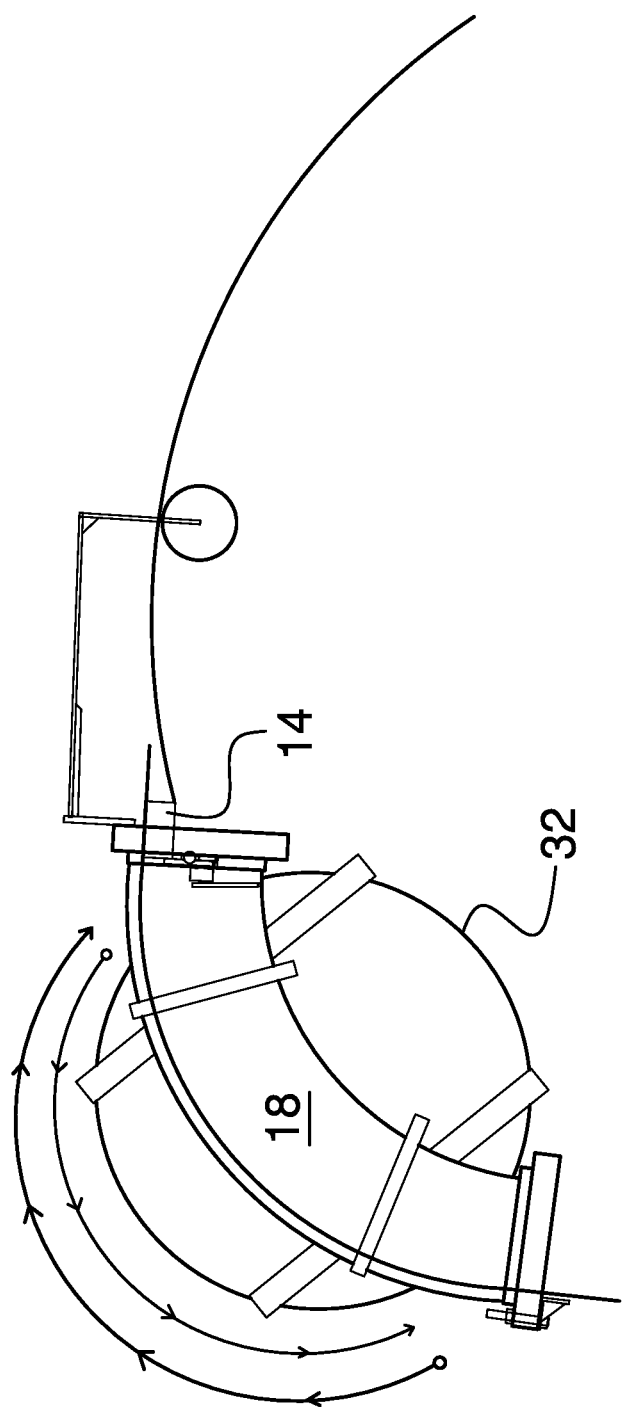

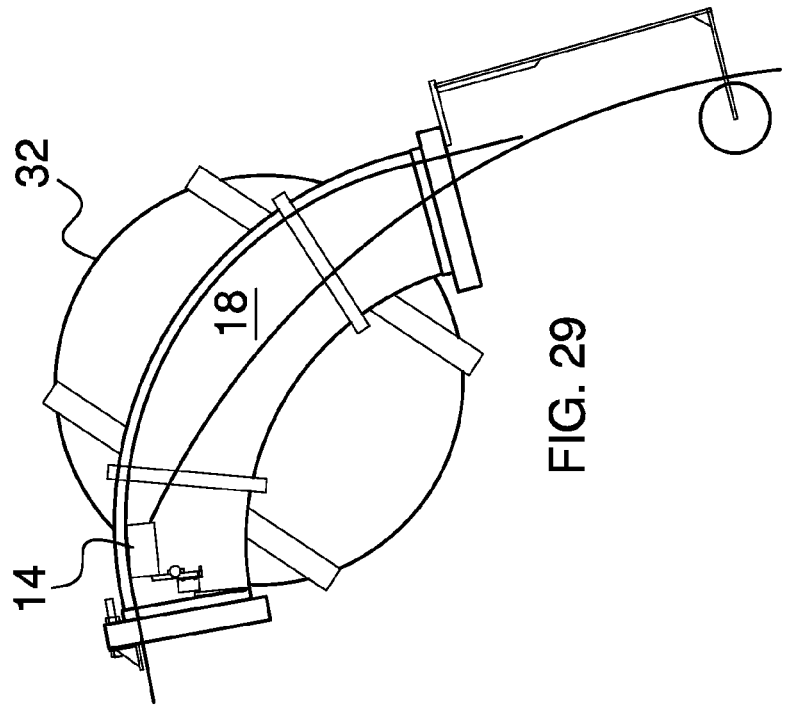
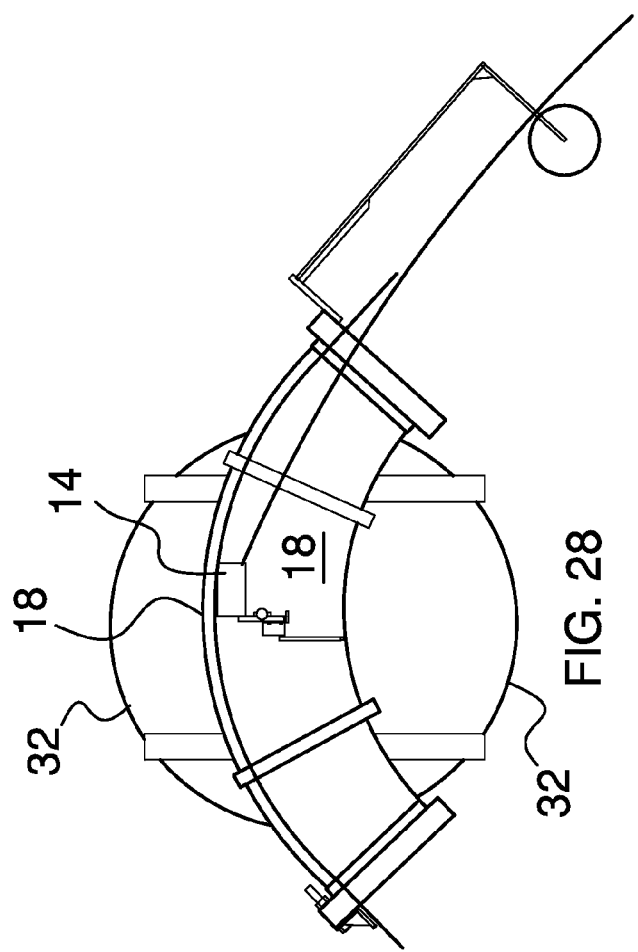

METHOD AND APPARATUS FOR CLADDING AN INTERIOR SURFACE OF A CURVED PIPE

FIELD OF THE INVENTION

The present invention relates generally to applying wear resistant or hard surface coatings to the interior surfaces of pipe sections, and more particularly, relating to an apparatus and method of the longitudinal application of a cladding material to interior surface of a pipe sections.

BACKGROUND OF THE INVENTION

It is desirable in various industrial application to clad the interior surfaces of metallic pipe sections with wear resistant or hard surface coatings to protect the interior surfaces against corrosion, abrasion, and/or surface contamination. The interior surfaces of pipe sections are typically clad by depositing the cladding material thereon using well known methods in the field of automatic or semi-automatic electric arc welding. Best results are typically achieved when this procedure is conducted in the "flat plane" position, e.g. with the surface to receive the molten cladding material being disposed below and horizontal with respect to the weld head, as opposed to the "horizontal" or "overhead" positions.

Cladding the interior surfaces of curved piped sections is difficult and expensive. There exists numerous systems, methods and devices for cladding the interior surfaces of curved pipe sections. An example of device and method for circumferential application of a cladding material to the interior surface of a curved pipe section is described in U.S. Pat. No. 6,234,383. An example of a device and method for the helical application of cladding material to the interior surface of a curved pipe section is described in U.S. Pat. No. 6,234,383. While these existing devices and methods fulfill their particular objectives, a need remains for an apparatus and method of longitudinally cladding the interior surfaces of a curved pipe section in an efficient and cost effective manner.

SUMMARY OF THE INVENTION

It is an object of the present invention to provide a method and apparatus for longitudinally cladding the interior surface of a pipe section in an efficient and cost effective manner.

It is an object of the present invention to provide a method an apparatus for cladding the interior surface of a pipe section that can be configured to various pipe dimensions It is an object of the present invention to provide a method and apparatus for cladding the interior surface of a pipe section wherein localized damage to the interior surface of the pipe section can be prepared.

It is an object of the present invention to provide a method and apparatus for cladding the interior surface of a pipe section wherein heat input to the pipe section is controlled.

It is a further object of the present invention to provide a method and apparatus for cladding the interior surface of a pipe section including a robotic crawler.

It is a further object of the present invention to provide a method and apparatus for cladding the interior surface of a pipe section including a track assembly that conforms to the interior surface of the pipe section.

It is a further object of the present invention to provide a method and apparatus for cladding the interior surface of a pipe section including a control cable suspension assembly.

It is a further object of the present invention to provide a method and apparatus for cladding the interior surface of a pipe section wherein several different material applicators and process may be employed.

To achieve these and other advantages, in general, in one aspect an apparatus for cladding an interior surface of a curved pipe is provided. The apparatus includes a pipe support having a pipe support rotational axis. The pipe support is configured to hold the curved pipe for conjoint rotation therewith about the pipe support rotational axis with a longitudinal axis of the curved pipe aligned perpendicular to the pipe support rotational axis. The apparatus further includes a track assembly having a flexible track section and pair of track mounts. The track mounts are configured to fixedly engage opposite ends of the curved pipe and are configured to secure the flexible track section longitudinally along the interior surface of the curved pipe with the flexible track section in tension/compression and in engagement with the interior surface of the curved pipe and conformed to a radius of curvature of the interior surface of the curved pipe. A crawler is supported for movement along the flexible track section. An arm is supported by the crawler and an applicator mount is rotatably attached to the arm for rotation about an applicator mount rotational axis. The applicator mount is configured to removably hold a material applicator for conjoint rotation therewith. A crawler drive is configured to reciprocate the crawler along the flexible track. An applicator mount drive is configured to rotate the applicator mount about the applicator mount rotational axis. A pipe support drive is configured to rotate the pipe support about the pipe support rotational axis. A cable support is disposed for conjoint movement with the pipe support.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings:

FIG. 15 is a diagrammatic front view of the apparatus in-use shown with the platform positioned in the vertical and the pipe section oriented in a sag position and at a full clockwise rotation position;

FIG. 16 is a diagrammatic front view of the apparatus in-use shown with the platform positioned in the vertical and the pipe oriented in a sag position and at an intermediate rotation position;

FIG. 27 is a diagrammatic front view of the apparatus in-use shown with the pipe platform positioned in the vertical and the pipe section oriented in a over-bend position and at a full clockwise rotation position;

FIG. 28 is a diagrammatic front view of the apparatus in-use shown with the platform positioned in the vertical and the pipe oriented in a over-bend position and at an intermediate rotation position;

FIG. 29 is a diagrammatic front view of the apparatus in-use shown with the platform positioned in the vertical and the pipe oriented in a over-bend position and at a full counterclockwise rotation position.

DETAILED DESCRIPTION OF THE INVENTION

As a preliminary matter, it should be noted that in this document (including the claims) directional terms, such as "above", "below", "upper", "lower", etc., are used for convenience in referring to the accompanying drawings. Additionally, it is to be understood that the various embodiments of the invention described herein may be utilized in various orientations, such as inclined, inverted, horizontal, vertical, etc., without departing from the principles of the invention.

In this description, references to "one embodiment" or "an embodiment" mean that the featuring being referred to is included in at least one embodiment of the invention. Moreover, separate references to "one embodiment" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the embodiments described herein.

Figure 1:
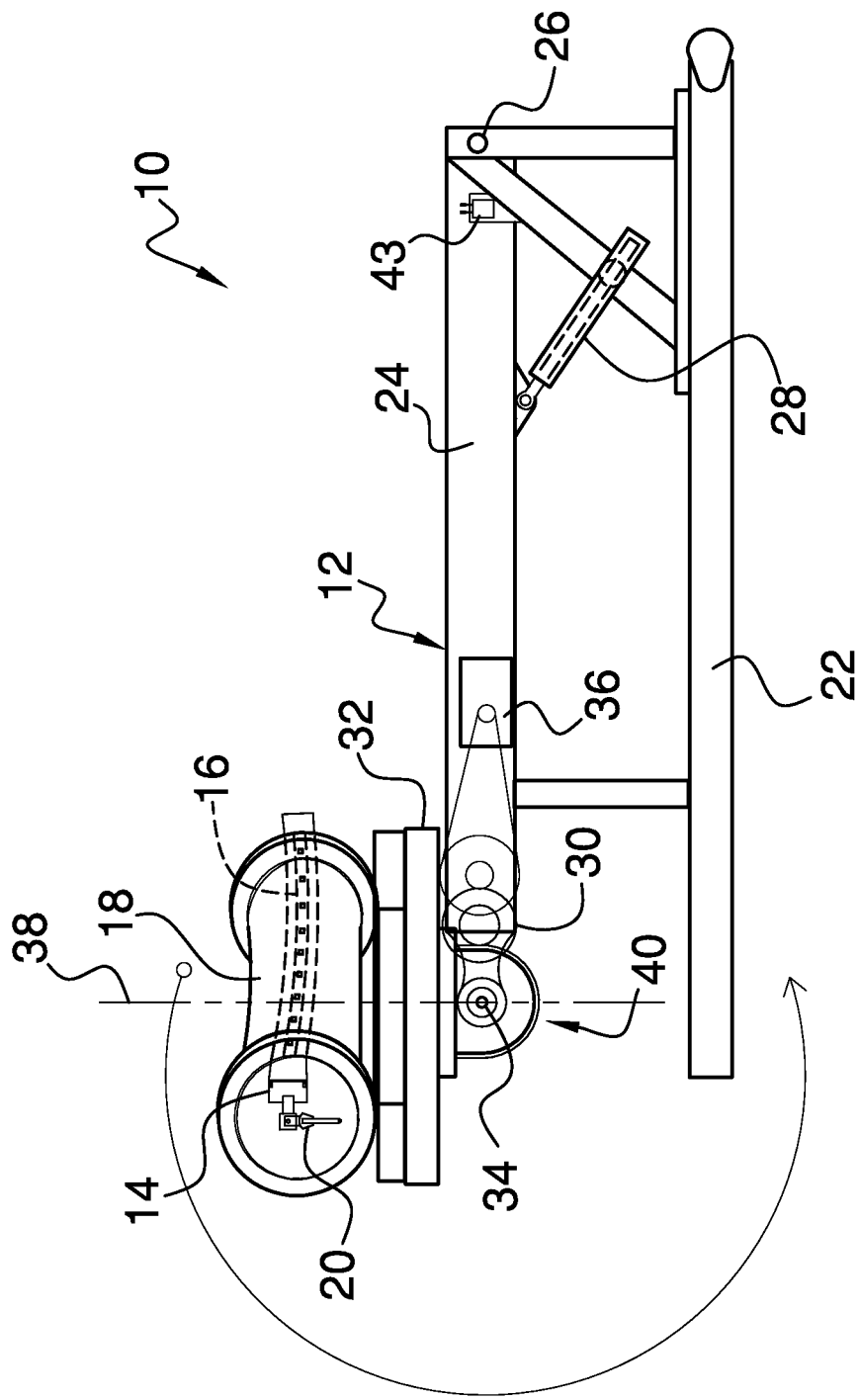
FIG. 1 is a diagrammatic first side view of the apparatus in accordance with the principles of the present invention.
Figure 2:
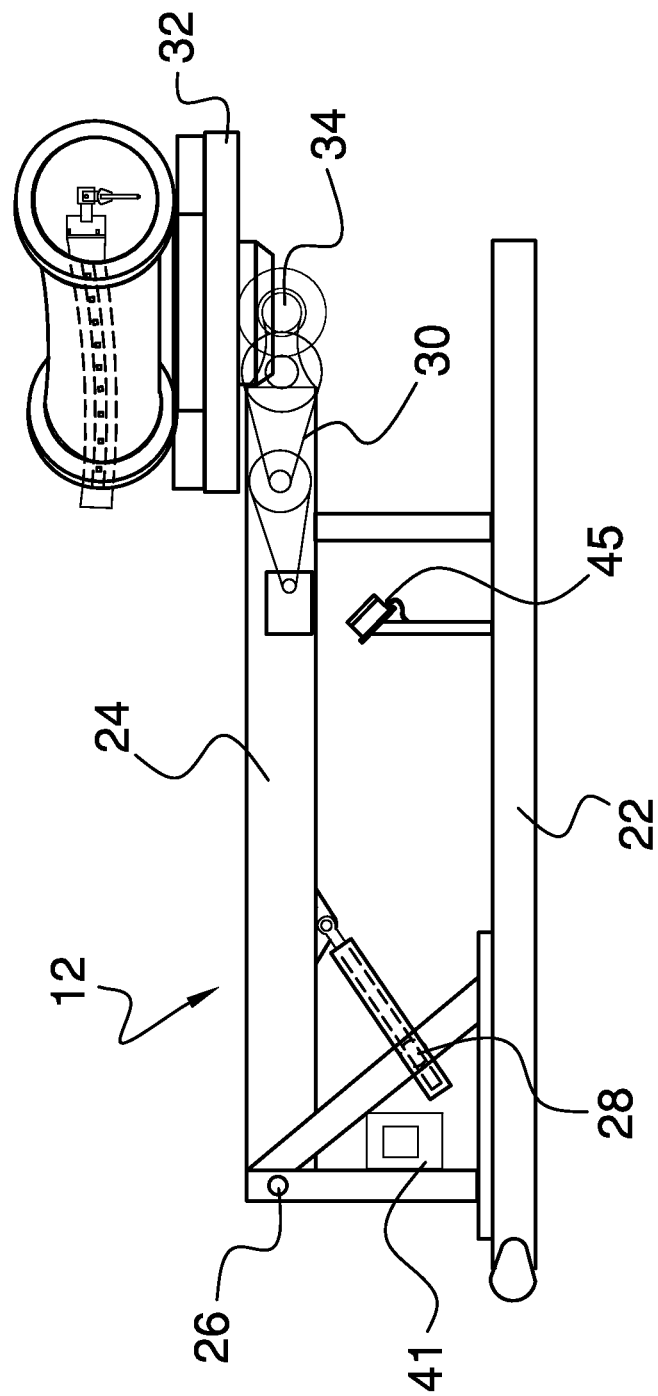
FIG. 2 is a diagrammatic second side view of the apparatus in accordance with the principles of the present invention.

In FIGS. 1 and 2, there is schematically illustrated an apparatus and method 10 for cladding an interior surface of a curved pipe section embodying the principles and concepts of the present invention, wherein FIG. 1 is a first side elevation view and FIG. 2 is a second side elevation view of the apparatus and method. The apparatus and method 10 may be configured to apply various overlay material using different applications, such as GMAW, PTA powder, PTA wire, or oxyacetylene S.P. Powder, among others. While the apparatus and method 10 is particularly suited and useful in cladding interior surfaces of a curved pipe section, such as, but not limited to a 45-degree elbow section or a 90-degree elbow section, the apparatus and method may also be used to clad curved pipe sections having straight transitions or entirely straight pipe sections.

Apparatus 10 broadly includes a positioner 12 that supports and maneuvers a pipe section 18 through space, a robotic crawler 14 that supports and positions a material applicator 20 and a track assembly 16 upon which the robotic crawler traverses. The positioner 12 includes a base 22 upon which is supported a cantilever boom 24 for rotation or tilting about a boom axis 26 (extending into and out of the paper). Actuator 28 operates to rotate the cantilever boom 24 about the boom axis 26 to vertically raise and lower end 30 of the cantilever boom.

A platform 32 is supported at end 30 of the cantilever boom 24 and is conjointly vertically raised and lowered therewith. Platform 32 is supported at end 30 for rotation or tilting about a platform tilt axis 34 (extending into and out of the paper). A platform tilt axis drive 36 is operatively connected to platform 32. The platform tilt axis drive 36 operates to rotate or tilt the platform 32 about platform tilt axis 34 generally through a 180-degree arc about end 30, wherein at the 0-degree rotation the platform is positioned above boom 24 in the horizontal and at the 180-degree rotation the platform is positioned below the boom in the horizontal. Platform 32 is also supported by boom 24 for rotation about a platform rotation axis 38. A platform rotation axis drive, generally indicated by 40, is operatively connected to the platform 32. Platform rotation axis drive 40 operates to rotate the platform 32 about axis 38. Platform rotation axis 38 and platform tilt axis 34 are perpendicular. However, as the platform 32 is tilted about tilt axis 34 the rotation axis 38 is revolved about the tilt axis through the same 180-degree arc.

Positioner 12 further includes an electrical panel 41 connected to line-power to provide electrical power to the various electrically powered components of the positioner. Operator controls 43 permit controlling the operation of actuator 28 to tilt the boom 24 about axis 26. Operator controls 45 permit controlling the operation of the tilt axis drive 36 and the rotation axis drive 40.

Figure 3:
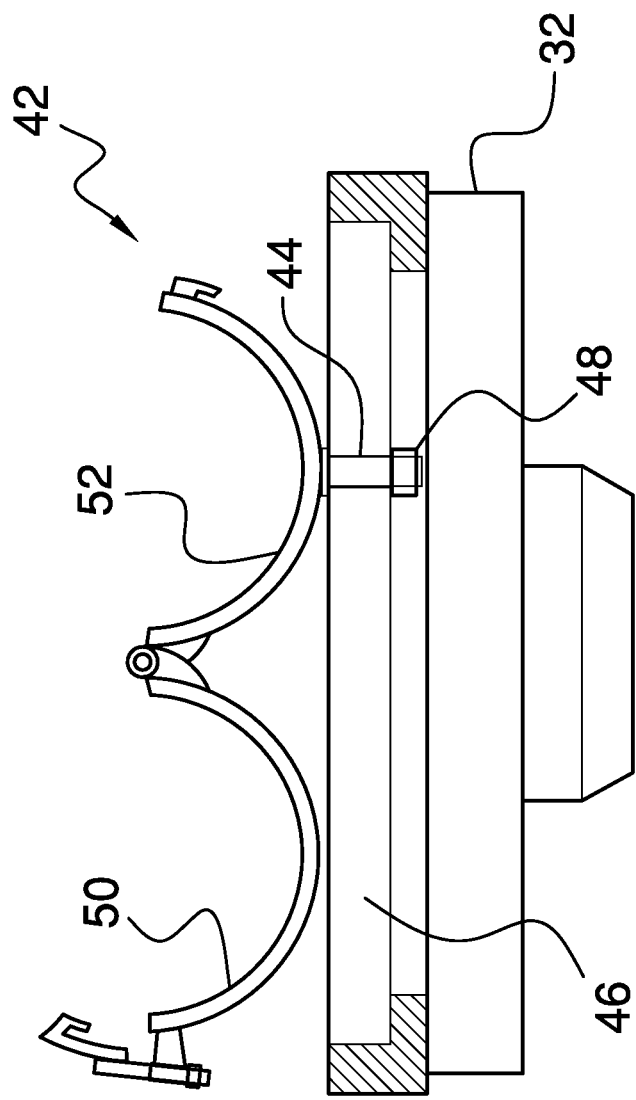
FIG. 3 is a diagrammatic view of an exemplary pipe clamp section clamp for securing a pipe section.

In FIG. 3, there is schematically illustrated the platform 32 and a pipe section bracket 42 for securing the pipe section 18 to the platform. Two or more pipe sections brackets 42 are used in securing the pipe section 18 to the platform 32. Each bracket 42 includes a lug 44 extending a slot 46 formed through the platform 32. The bracket 42 can be positioned across the platform 32 to a desired location and secured in place by tightening a threaded fastener 48 disposed at the end of the lug 44. As depicted here, the bracket 18 includes two confronting semi-circular half sections 50 and 52 pivotally connected together at one end such that the opposite ends can be rotated towards and away from one another. The opposite ends are fitted with a cooperating latch to releasable secured the ends together about a pipe section positioned between the half sections.

With reference to FIGS. 4 through 9, there is schematically illustrated several views and configurations of the track assembly 16. Track assembly 16 includes a flexible, elongated track section 54 configured to be positioned longitudinally within the interior of the pipe section 18 with the opposite ends 56 and 58 of the track section extending outwardly from pipe sections ends 60 and 62, respectively. As will be discussed in further detail, track section 54 is flexible to conform to the bend radius of the interior surface 64 of the pipe section 18 upon which the track section extends. In an embodiment, the track section 54 is fashioned from a continuous length of a light gauge sheet metal. The track section 54 is attached to ends 60 and 62 of the pipe section 18 by one or more of several track mounts 66, 68 and 70 depending upon the desired configuration. A plurality of spacer elements 72 may be disposed in a spaced relation along a length of a rearward surface of the track section 54 so as to provide a bearing support for engagement with the interior surface 64 of the pipe section 18 and to provide a continuous gap or spacing 74 between the interior surface of the pipe and the track section.

Figure 5:
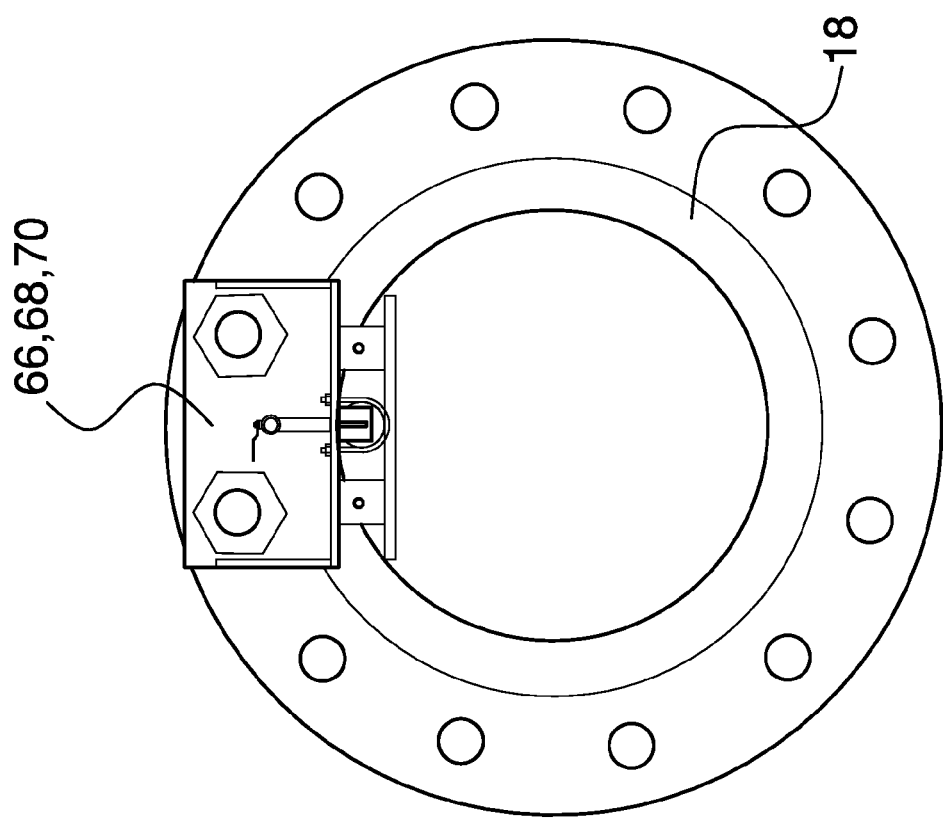
FIG. 5 is a diagrammatic end view of the pipe section and a track mount attached to the pipe section using a two-hole method.

Track mounts 66, 68, 70 are each configured to attach to the track section 54 approximate ends 56, 58 thereof and are further configured to attached to ends 60 and 62 of the pipe section 18, thereby supporting the track section approximate ends 56, 58 thereof from the ends 60, 62 of the pipe section. Track mounts 66, 68, 70 are attached to ends 60, 62 of the pipe section 18 by a bolted connection, such as the two-hole method as best depicted in FIG. 5. Alternatively, track mounts 66, 68, 70 may be clamped or temporarily welded to pipe sections ends 60, 62.

Figure 4:
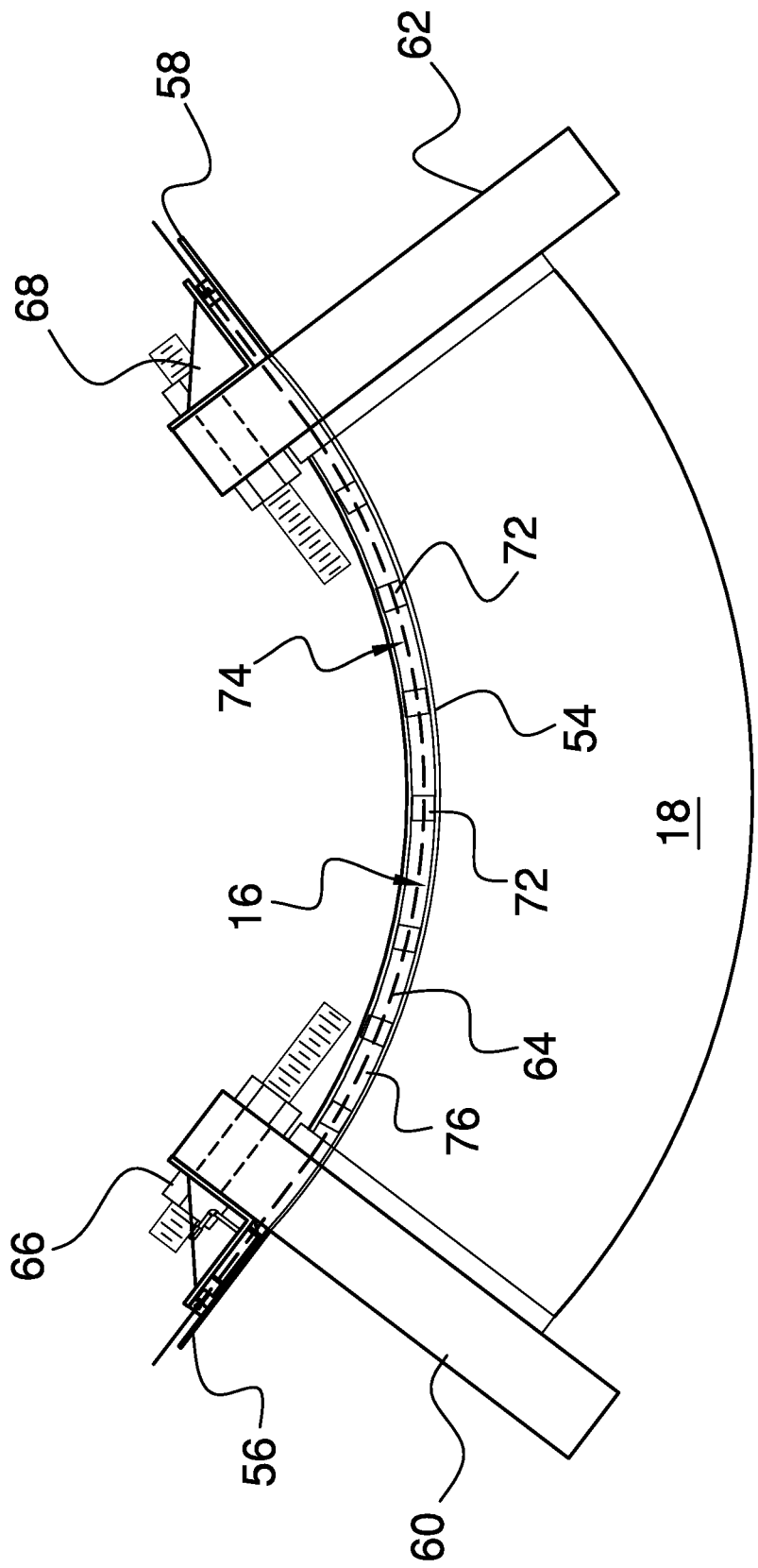
FIG. 4 is a diagrammatic view of a pipe section in a sag position having attached thereto a track assembly.

With particular reference to FIG. 4, in a first configuration, the track assembly 16 is secured to the short-side or interior radius of the pipe section 18. The pipe section 18 is illustrated in FIG. 4 in a "sag" position. In this configuration, track mounts 66 and 68 are employed to secure the track section 54 to ends 60, 62 of the pipe section 18. Track 68 is configured to apply opposite and outwardly directed forces on the track section 54 approximate end 56 to tension the track section, thereby causing the track section to bend and conform to the interior surface 64 of the short-side of the pipe section 18.

Figure 6:
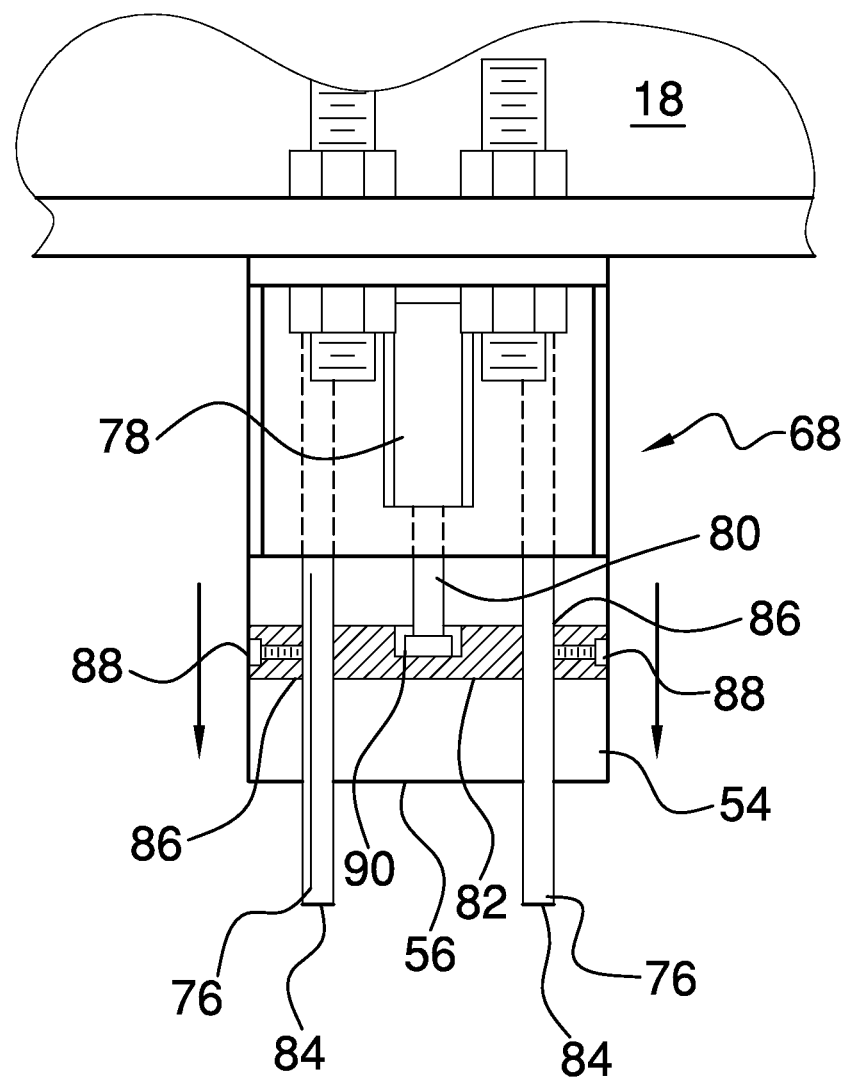
FIG. 6 is a diagrammatic top view of a first track mount and the track section.
Figure 7:
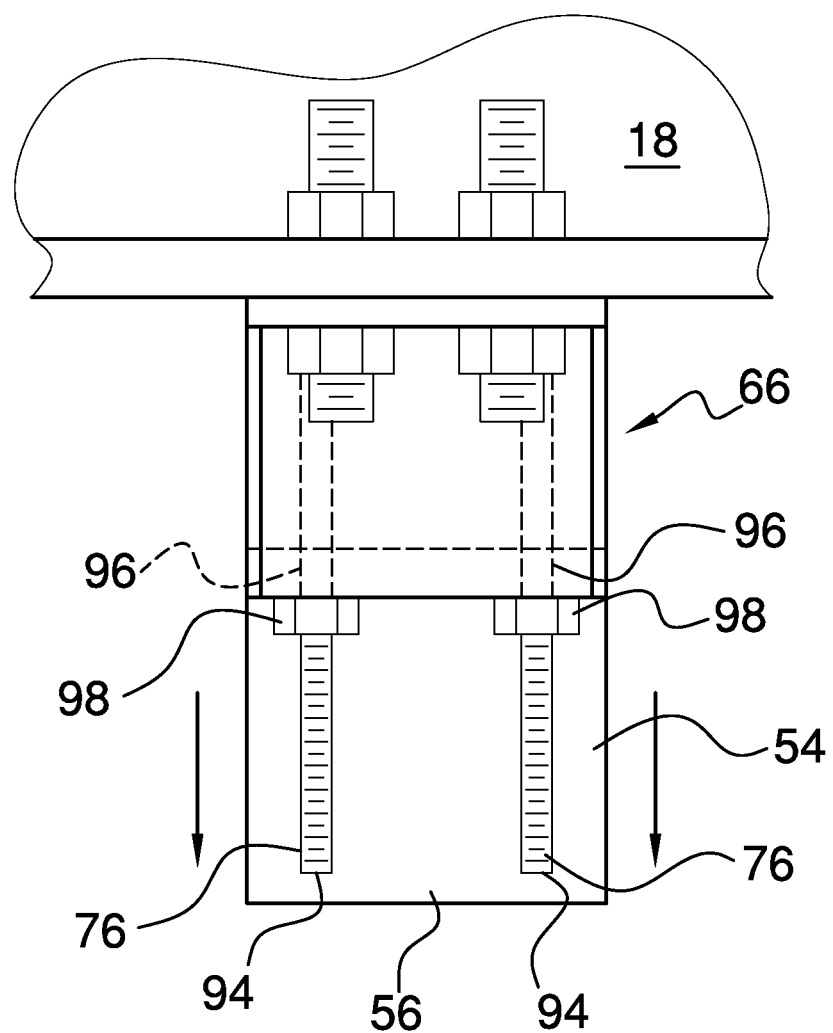
FIG. 7 is a diagrammatic top view of a second track mount and the track section.

In an embodiment, as best seen in FIGS. 4, 6 and 7 track mounts 66 and 68 include a plurality of tension rods 76 that are strung along the track section 54 through the spacer elements 72. With particular reference to FIG. 6, track mount 68 includes a hydraulic ram 78 having a piston rod 80 and a block member 82 fixedly secured to the track section 54 approximate end 58, for example by tack welding. A skilled artisan will readily appreciate block member 82 may be secured to track section 54 using other methods. End 84 of each torsion rod 76 extends through a corresponding bore 86 made through the block member 82 and is fixedly secured to the block member by threaded fastener 88. Piston rod 80 is in engagement with the block member 82 in recess or cup 90. Hydraulic ram 78 is operated to extend piston rod 80 to apply an outwardly directed force to block member 82 which is transferred through the block member into the tension rods 76 and the track section 54. With particular reference to FIG. 7, tack mount 66 includes a block member 92. End 94 of each torsion rod 76 extends through a corresponding bore 96 made through the block member 92. Ends 94 are threaded and secured by a respective nut 98. Tension in torsion rods 76 at ends 94 may be adjusted by the turning of nuts 98 to either increase the tension by drawing additional length of the torsion rod through block member 92 or to decrease the tension by reducing the length of the torsion rod through the block member. In this manner, the coordinated extension of piston rod 80 and the adjustment of the tension in torsion rods 76, the conformation of the track section 54 to the interior surface 64 of the pipe section 18 can be finely adjusted.

Figure 8:
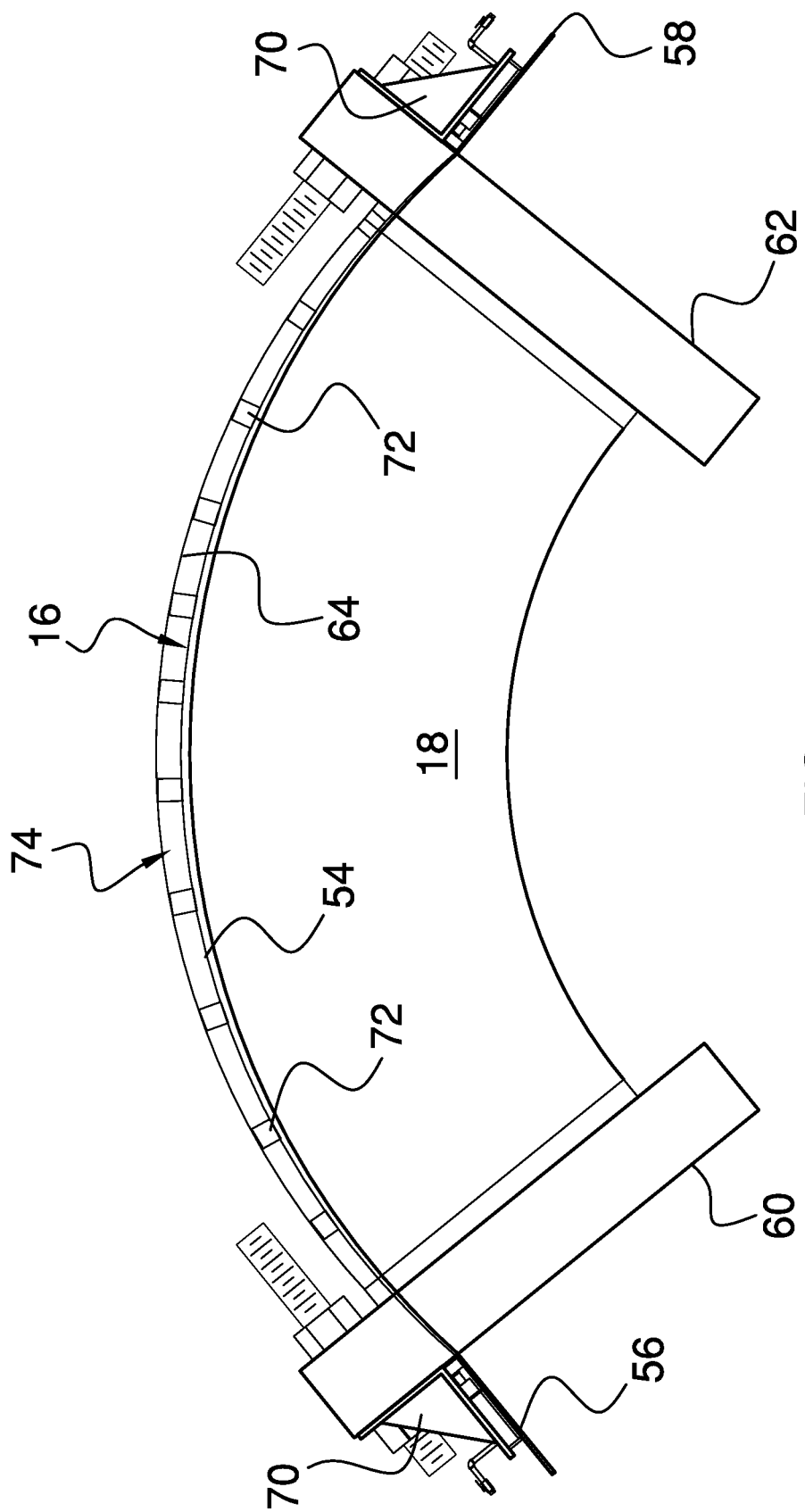
FIG. 8 is a diagrammatic view of the pipe section in an over-bend position having attached thereto the track assembly.

With particular reference to FIG. 8, in a second configuration, the track assembly 16 is secured to the long-side or exterior radius of the pipe section 18. The pipe section 18 is illustrated in FIG. 8 in a "over-bend" position. In this configuration, two track mounts 70 are employed to secure the track section 54 to ends 60 and 62, respectively, of the pipe section 18. Track mounts 70 are configured to apply opposite and inwardly directed forces on the track section 54 approximate ends 56 and 58 to compress the track section, thereby causing the track section to bend and conform to the interior surface 64 of the long-side of the pipe section 18.

Figure 9:
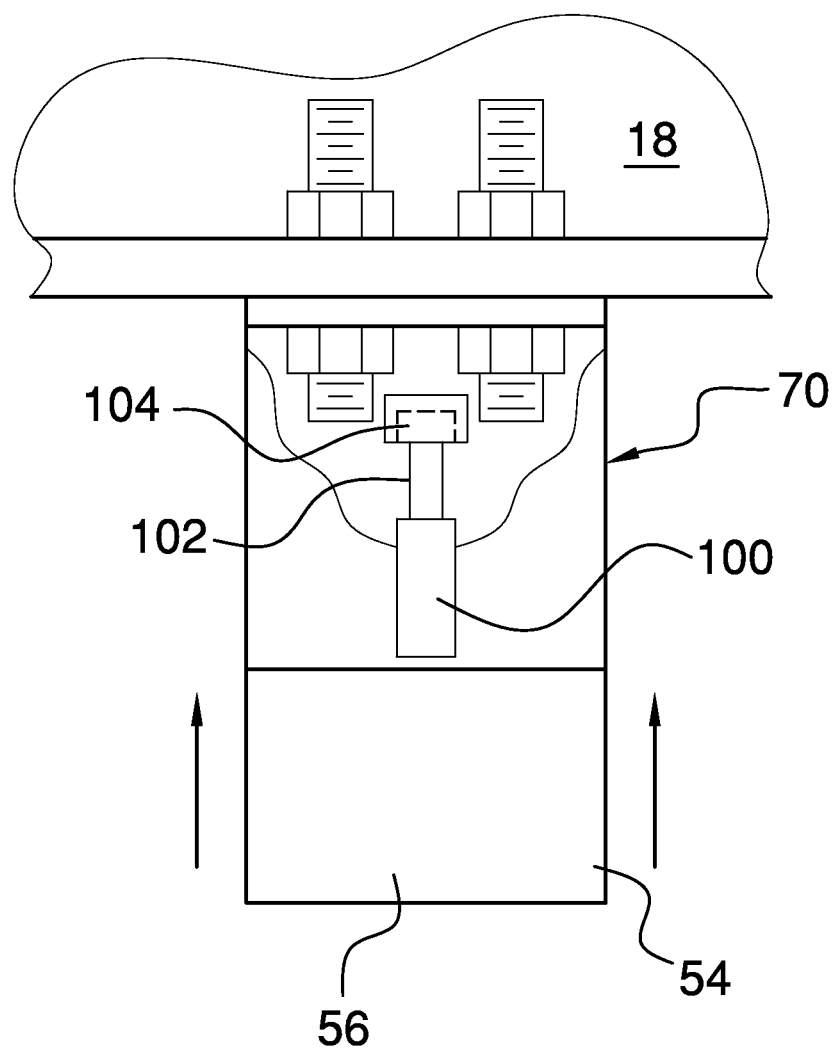
FIG. 9 is a diagrammatic top view of a third track mount and the track section.

In an embodiment as best seen in FIG. 9, track mount 70 includes a hydraulic ram 100 having a piston rod 102 and a block member 104 fixedly secured to the track section 54 approximate ends 56 for example by tack welding. A skilled artisan will readily appreciate block member 104 may be secured to track section 54 using other methods. Hydraulic ram 100 is operated to extend piston rod 102 to apply an inwardly directed force to block member 104 which is transferred through the block member into the track section 54. While only one track mount 70 is illustrated in FIG. 9, the oppositely positioned track mount has an identical construction and operation. In this manner, the coordinated extension of piston rods 102, the conformation of the track section 54 to the interior surface 64 of the pipe section 18 can be finely adjusted.

In FIGS. 10 through 13, there is schematically illustrated several views of the robotic crawler 14. The robotic crawler 14 is configured to travel along the track section 54 within the interior of the pipe section 18. The robotic crawler 14 is equipped with track guide wheels 106, two on each side of the robotic crawler. The track guide wheels 106 include circumferential grooves 108 that engage opposite side edges 110 of the track section 54. The robotic crawler 14 is driven along the track section 54 by one or more motorized wheels 112 that engage the surface of the track section.

The robotic crawler 14 is further equipped with an arm 114 that includes both a lateral position adjuster 116 and a vertical position adjuster 118 that permit adjustment of relative position of the arm with respect to the crawler 14, and thus with respect to the pipe section 54, thereby permitting centering of a material applicator head 20 in reference to pipe dimensions. An applicator mount 120 is attached to the arm 114 for rotation about an applicator mount rotation axis 122. An applicator mount drive, such as motor 124 is operatively connected to the applicator mount 120 and operates to rotate applicator mount about the applicator mount rotation axis 122, as will be further discussed below. The applicator mount 120 is configured to removably receive and retain a material applicator head, such as welding head 20. Other applicator heads and methods may include GMAW, PTA powder, PTA wire, or oxyacetylene Spray Transfer (ST) powder, among others.

Robotic crawler 14 is also equipped with one or more level sensors 126 that operate to measure the pitch of the robotic crawler as it traverses along the track section 54. The robotic crawler 14 further includes and forward/reverse switches 128 and 130 that operate to detect when the robotic crawler as reached a stop location along the track section 54 and must reverse travel direction along the track section, as will be further discussed below.

Figure 10:
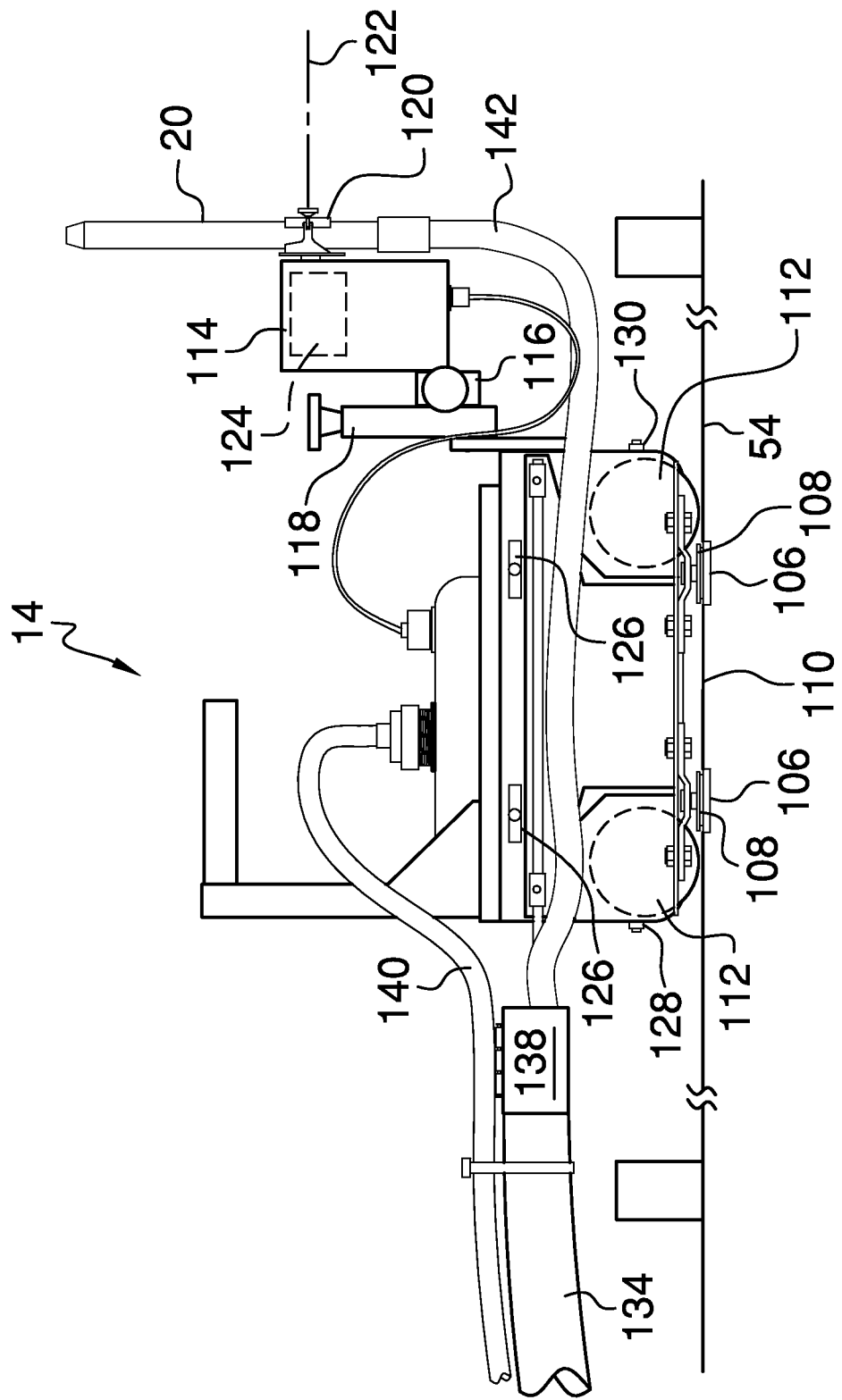
FIG. 10 is a diagrammatic side view of a robotic crawler of the apparatus.
Figure 11:
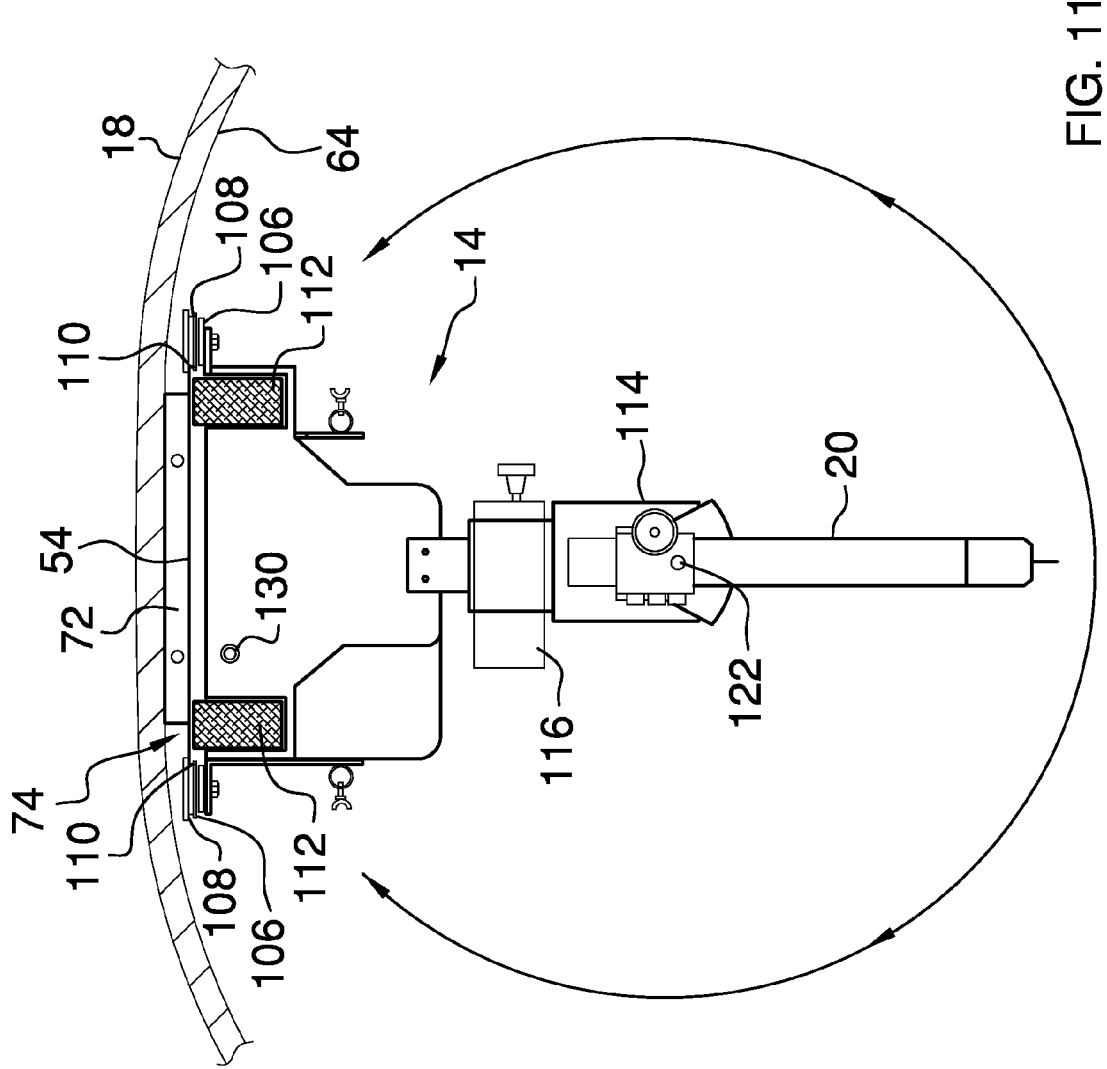
FIG. 11 is a diagrammatic front view of the robotic crawler.
Figure 12:
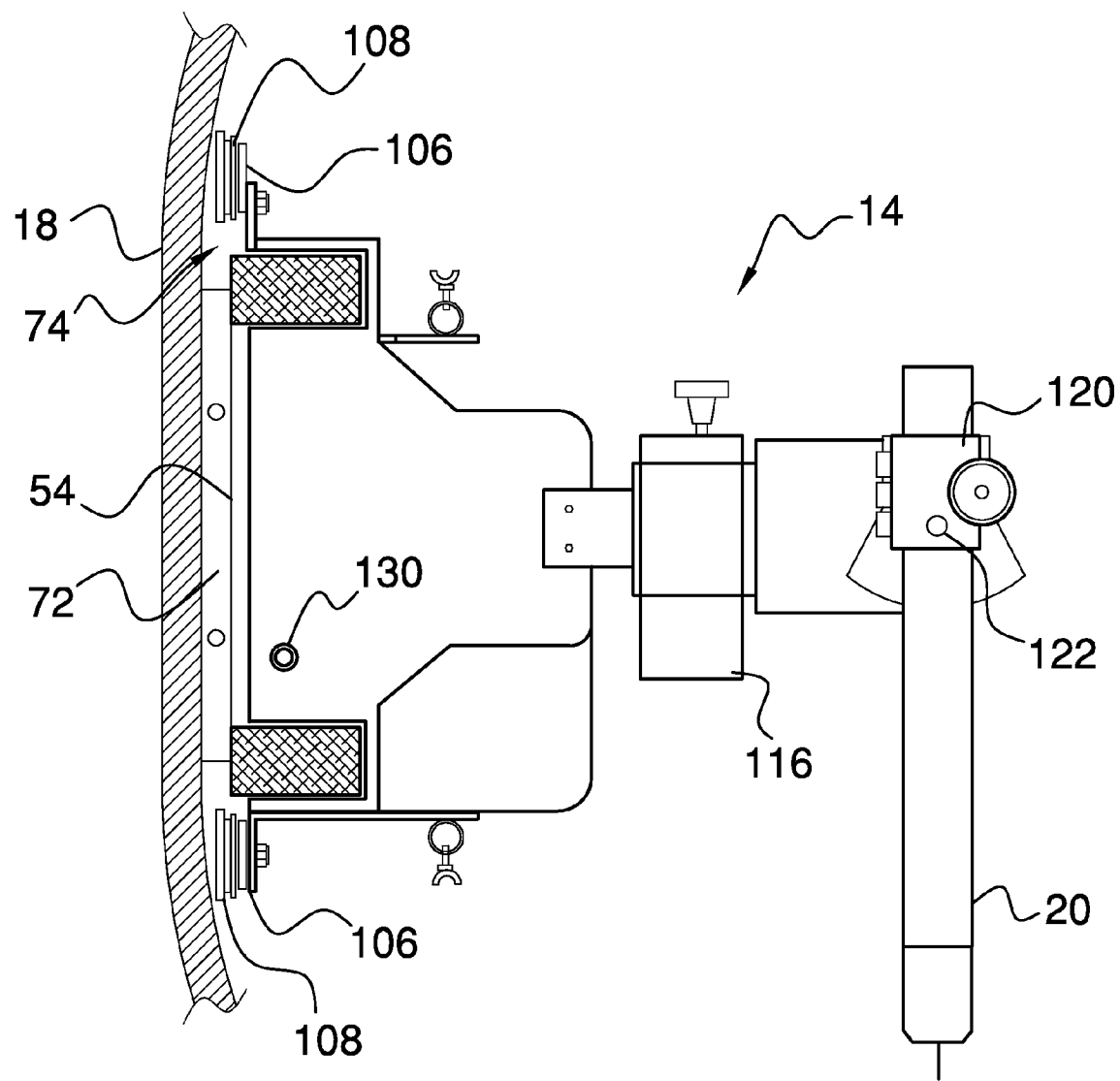
FIG. 12 is a diagrammatic front view of the robotic crawler in an alternative operating position.
Figure 13:
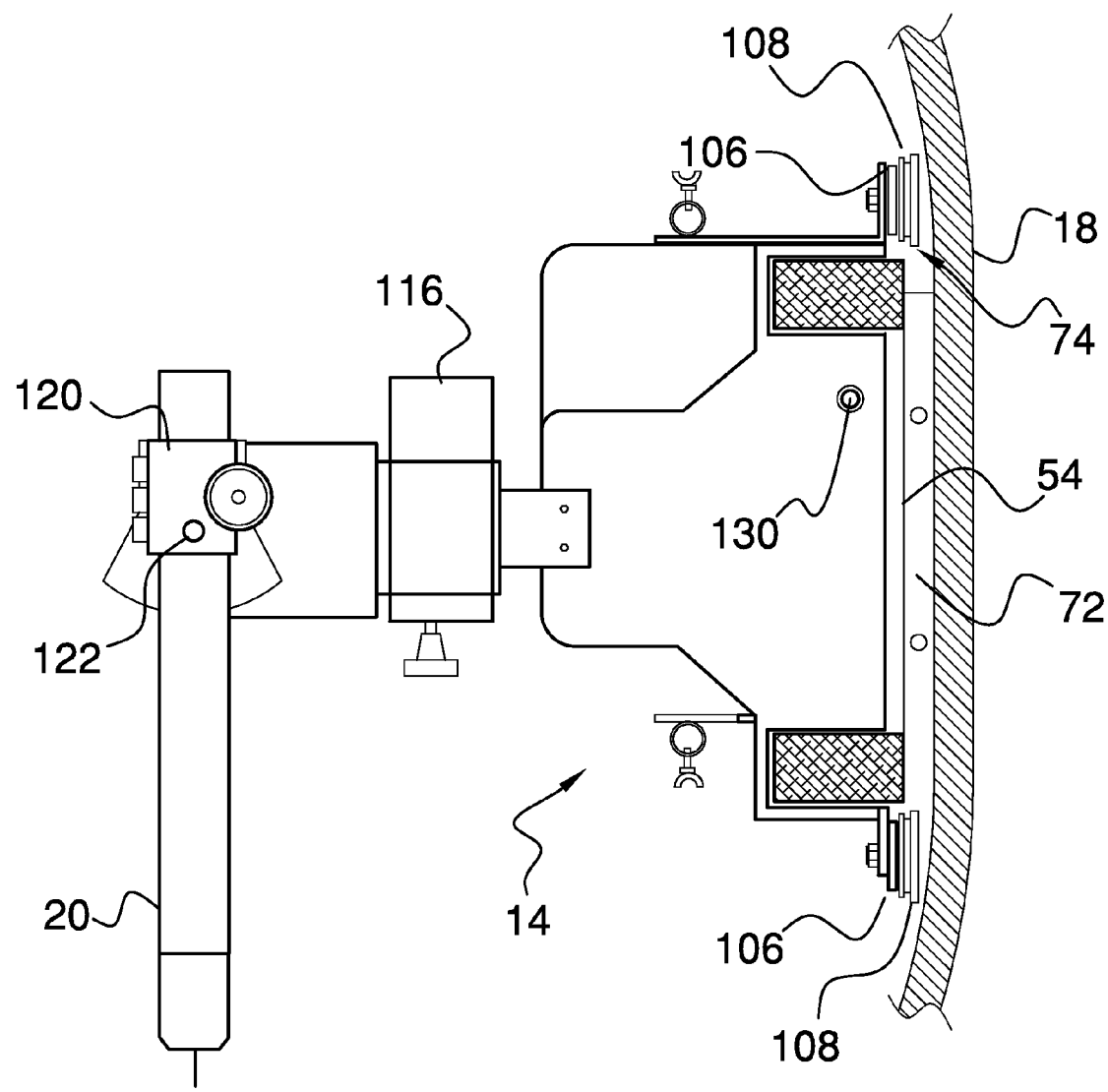
FIG. 13 is a diagrammatic front view of the robotic crawler in an alternative operating position.
Figure 17:
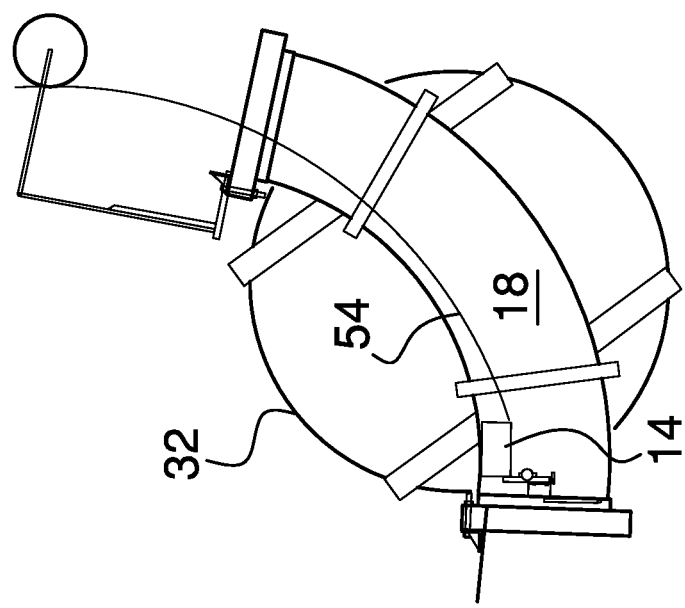
FIG. 17 is a diagrammatic front view of the apparatus in-use shown with the platform positioned in the vertical and the pipe oriented in a sag position and at a counterclockwise rotation position.
Figure 18:
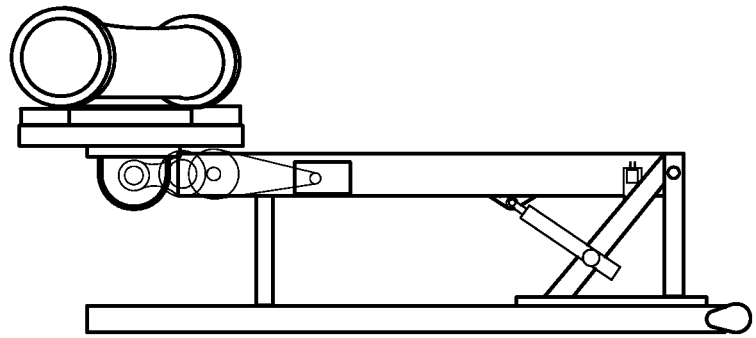
FIGS. 18 through 26 are diagrammatic time stop positions of the platform being positioned in space in a first stage of operation wherein a long-side of the bend of the pipe section is being clad.
Figure 19:
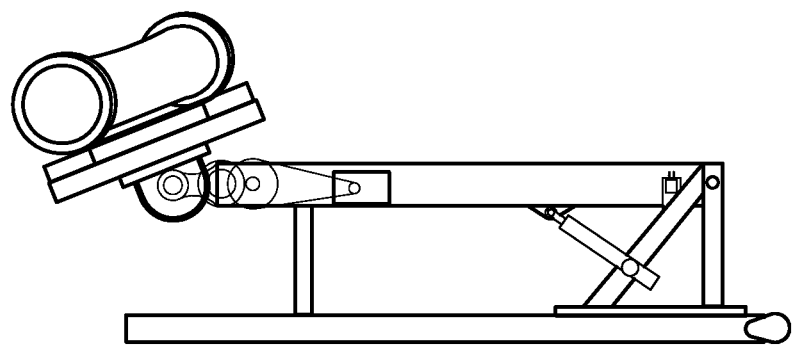
Figure 20:
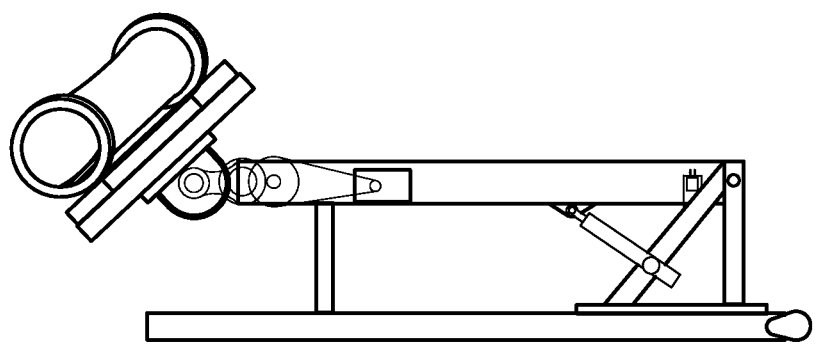
Figure 21:
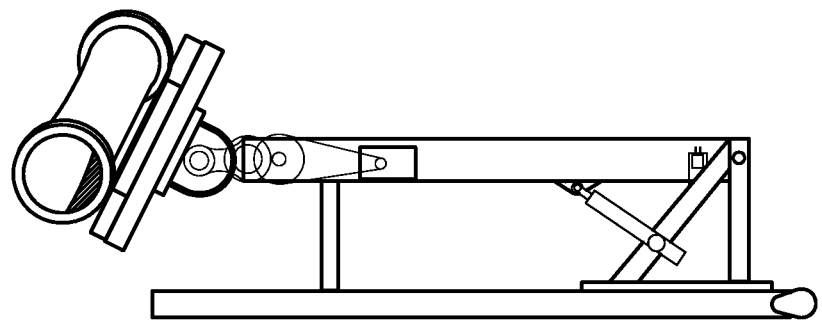
Figure 22:
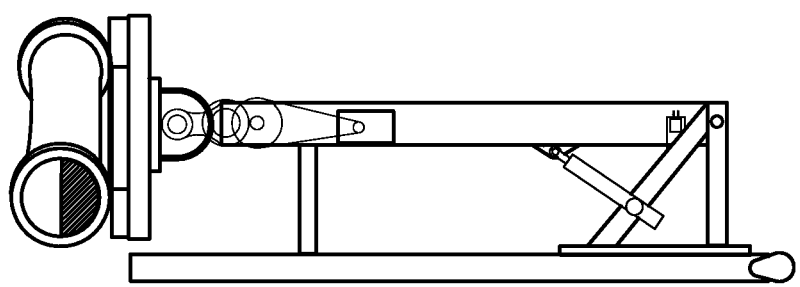
Figure 23:
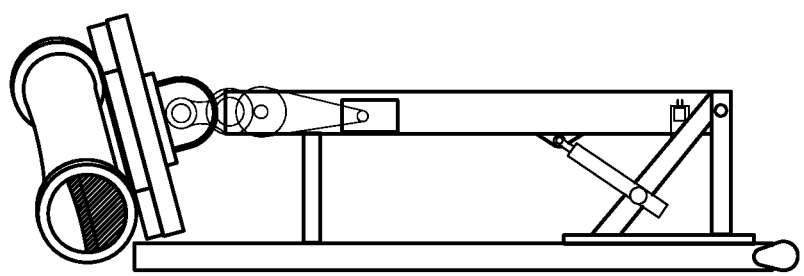
Figure 24:
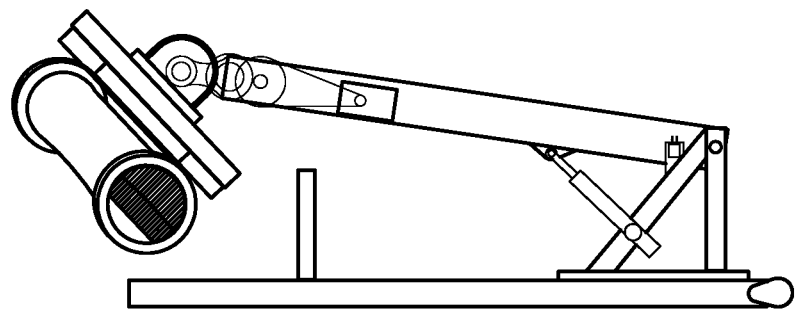
Figure 25:
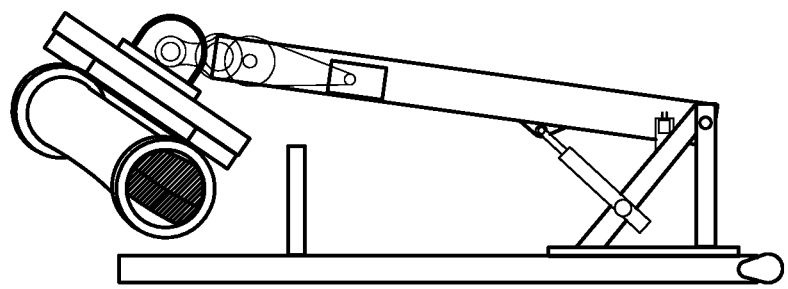
Figure 26:
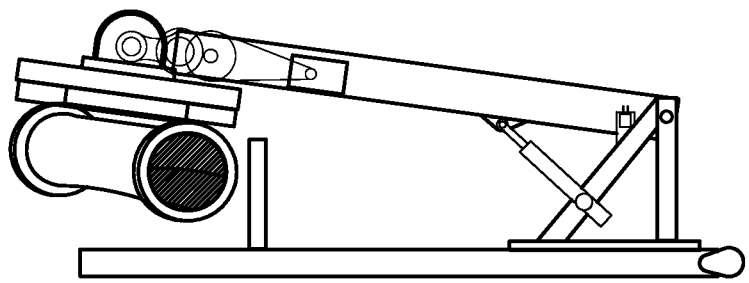

Apparatus 10 further includes a cable guide suspension assembly 132 having a cable conduit 134 and a suspension wheel 136, as seen in FIGS. 15 through 17. The suspension wheel 136 that is attached to an end 60, 62 of the pipe section 18 in a cantilever manner such that the suspension wheel is positioned outwardly from the end of the pipe to which it is mounted. An end of the cable conduit 134 may be connected to the robotic crawler 14 for conjoint movement therewith by an adjustable coupling 138 positioned on one or both sides of the robotic crawler, as best seen in FIG. 10. The opposite end and the length of the cable conduit is threaded across suspension wheel 136 where it is supported for reciprocal movement. Control cables 140 as well as material applicator head cabling 142 is run through or along the cable conduit 134 for support without impeding the movement of the robotic crawler 14 along track section 54.

In an embodiment, the crawler 14 may be equipped with a closed circuit camera connected to a display screen or a video recorder to permit viewing of the cladding operation of apparatus 10. This may be desired in the cladding of long radius pipe sections when visual contact with the cladding process is eliminated.

Figure 14:
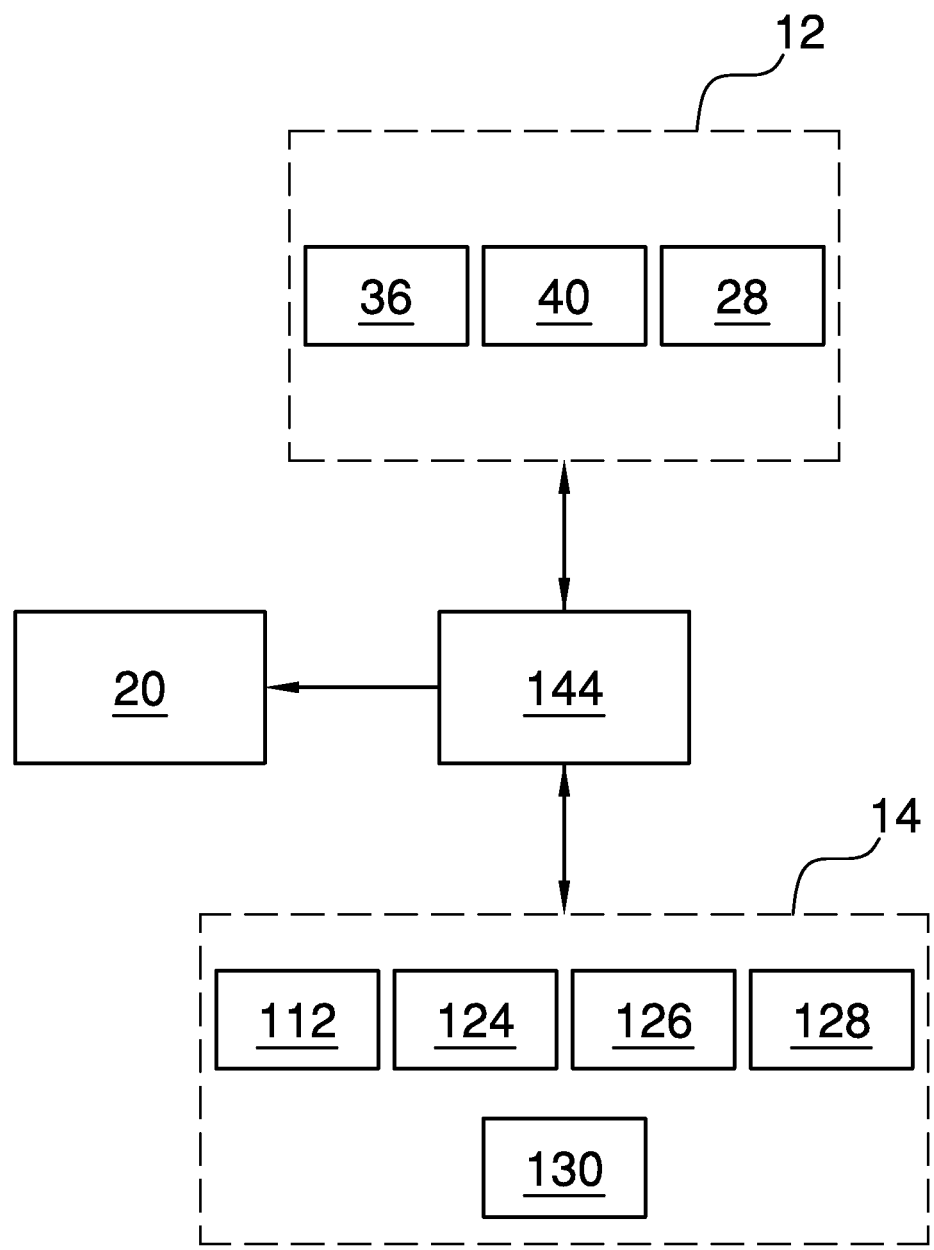
FIG. 14 is a block diagram of an exemplary controller.

In FIG. 14, there is illustrated a block diagram of a control system or controller 144 of the apparatus and method 10. Controller 144 permits automated or semi-automated operation of apparatus 10, including the positioner 12 the robotic crawler 14 and the material applicator head 20 in a coordinated control to sequentially and longitudinally clad the interior surface 64 of the pipe section 18. Controller 114 may be operatively connected to the actuator 28, platform tilt axis drive 36, platform rotation axis drive 40, one or more motorized wheel 112, level sensors 126, forward/reverse switches 128, 130, applicator mount drive 124 and material applicator 20 for coordinated operation of the same.

As discussed below, cladding the interior surface 64 of the pipe section 18 is a two stage process. The stages being separated by the positioning of the track assembly 16 on the short-side of the pipe section (FIG. 4) to clad the opposite portion, or long-side of the interior surface. Then, positioning the track assembly 16 on the long-side of the pipe section 18 (FIG. 8) to clad the opposite portion, or short-side of the interior surface 64.

With reference to FIGS. 15 though 30, there is schematically illustrated a first stage operation of the apparatus and method 10, wherein FIGS. 15 through 17 illustrate stop time motion of the platform rotated about the platform rotation axis, and FIGS. 18 through 30 illustrate stop time motion of the platform rotated about the platform tilt axis 38 and the boom 24 rotated about the boom axis 26. The first stage is completed with the pipe section 18 in a sag position. The second stage is completed with the pipe section 18 in an over-bend position.

The method of cladding the interior surface 64 of the pipe section 18 begins with setting up the apparatus 10 on the short-side of the pipe section as fully explained above and shown in FIG. 1. Operation of the positioner 12, the robotic crawler 14 and the material applicator 20 are coordinated to longitudinally clad the interior surface 64 of the pipe section 18 in sequential back-and-forth movement of the robotic crawler across the track section 54 to apply a series of longitudinally extending welds having a desired overlap. The length of travel of the robotic crawler 14 along the track section 54 is controlled by the placement of end stops 146 and 148 at opposite ends of the track section, as best seen in FIG. 10. Once the robotic crawler 14 reaches the end of its travel direction, forward/reverse switches 128, 130 make contact with a respective end stop 146, 148 signaling the robotic crawler to reverse travel direction along the track.

From a start location (FIG. 1), the robotic crawler 14 traverses the interior of the pipe section 18 along the track section 54 in a first direction while the material applicator 20 is maintained in a flat position and operated to apply a strip of overlay material onto the interior surface 64 of the pipe section. The robotic crawler 14 is triggered to reverse its travel direction along the track section 54 as a result of the forward/reverse switch 128 being triggered from contact with stopper 146. The applicator mount drive 124 is operated to rotate or index the material applicator 20 by rotating the applicator mount 120 about the applicator mount axis 124 a desired width relative to the previously laid material strip. For example, the applicator mount drive 124 may operate to index the material applicator 20 to apply a sequential material strip having an overlap with the subsequent material strip. The robotic crawler 14 then travels back along the track section 54 toward the start location. Once again, the robotic crawler 14 is triggered to reverse direction along the track section 54 as a result of the forward/reverse switch 130 being triggered from contact with stopper 148. The applicator mount drive 124 is operated to index the material applicator 20 and the robotic crawler 14 begins to travel along the track section in the opposite direction. This back-and-forth cycle continues as the overlay material is applied to the interior surface 64 of the pipe section.

To maintain the material applicator 20 in the flat position, the reciprocal movement of the robotic crawler 14 along the track section 54 is coordinated with the positioning of the platform 32 in space. Specifically, the positioner 12 operates to raise and lower the boom 24, to tilt the platform 32 and to rotate the platform as a function of both the location of the robotic crawler 14 within the pipe section and the progression of the overlay process, e.g. the number of longitudinal material strips applied to the interior surface 64. This coordinated motion is illustrated in stop time in FIGS. 18 through 30.

With specific reference to FIGS. 15 through 17 and 24, when the platform 32 is generally in the vertical plan, the level sensors 126 operate to provide a signal indicating the tilt of the robotic crawler 14 as it travels along the track section 54. Based upon the level sensor signal, the positioner 12 operates to rotate the platform 32 clockwise and counterclockwise to maintain the robotic crawler 14 generally in the horizontal plane and the material applicator 20 in the flat position. Essentially, the coordinated motion of the robotic crawler 14 and the positioner 12 results in the robotic crawler generally maintaining a static horizontal position with the pipe section 18 rocking back-and-forth as best seen in FIGS. 15 through 17. As can further be seen, the pipe section 18 is in a sag position.

Figure 30:
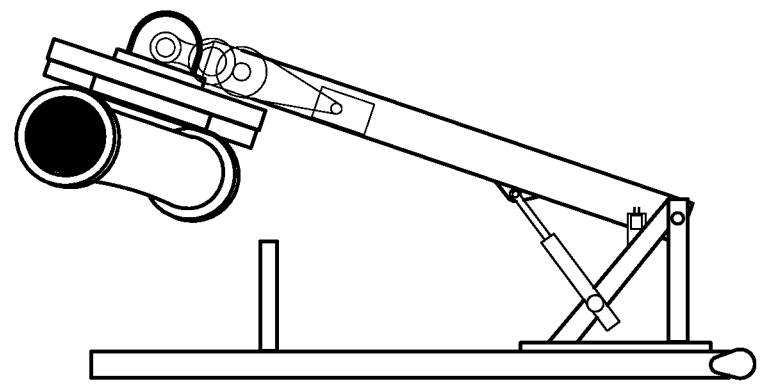
FIGS. 30 through 38 are diagrammatic time stop positions of the platform being positioned in space in a second stage of operation wherein a short-side of the bend of the pipe section is being clad.
Figure 31:
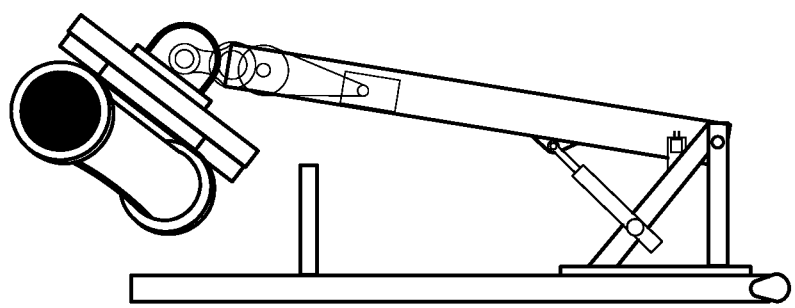
Figure 32:
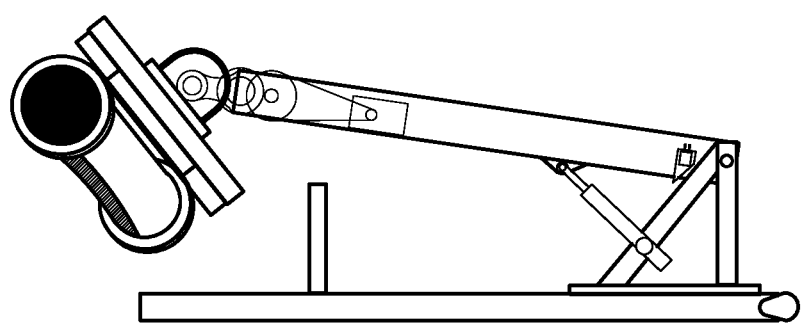
Figure 33:
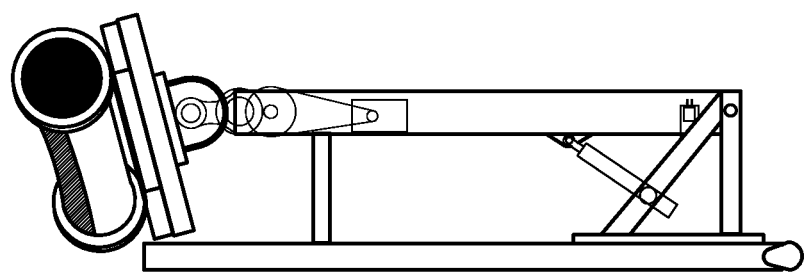
Figure 34:
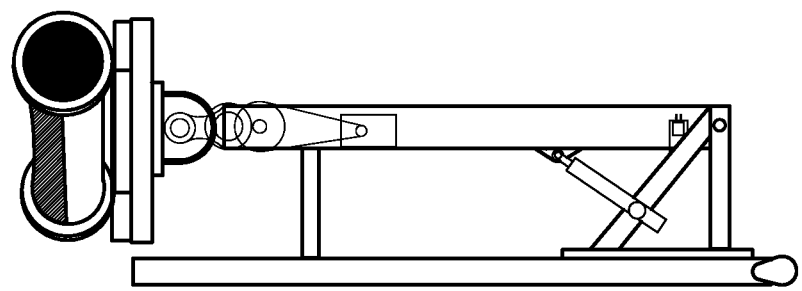
Figure 35:
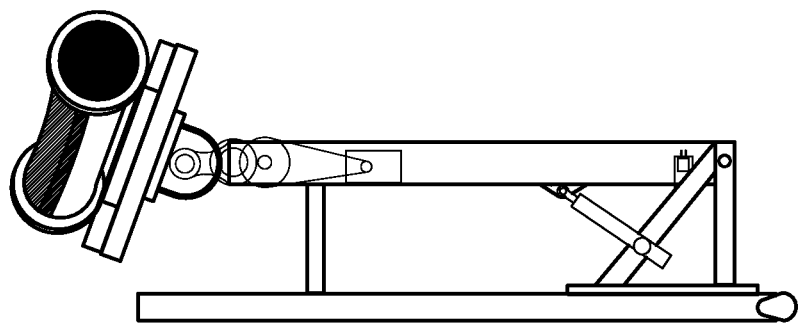

This above-described first stage process continues until the entire first half of the interior surface 64 of the pipe section 18 has been clad with over lay material. Completion of first stage results in the platform 32 from being positioned horizontally and above the boom 24 (FIG. 18) to being positioned horizontally and below the boom (FIG. 30).

Figure 36:
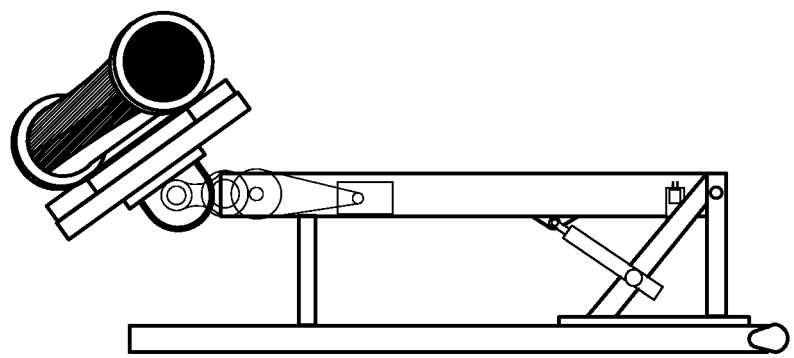
Figure 37:
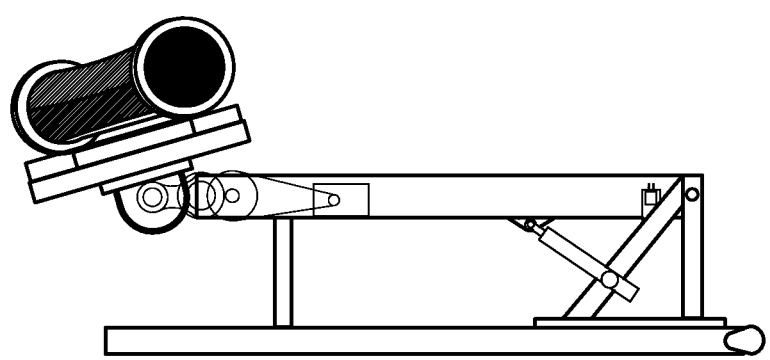
Figure 38:
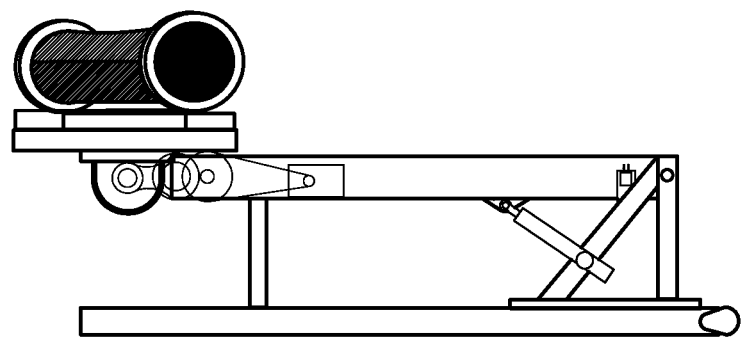

The second stage begins by moving the robotic crawler 14 and the track assembly 16 is from the short-side of the pipe section 18 to the long-side of the pipe section (FIG. 8) with the pipe section 18 in an over-bend position to apply the overlay material to short-side of the interior surface 64 of the pipe section. The second stage of the process is illustrated in FIGS. 31 through 44. Essentially, the second stage process is exactly the same as discussed above with the exception of the platform being moved from an initial position below the boom 24 (FIG. 36) to a final position above the boom (FIG. 44) and the pipe section 18 being in an over-bend position. Accordingly, a skilled artisan will readily understand and appreciate the second stage process without a complete discussion herein.

A number of embodiments of the present invention have been described. Nevertheless, it will be understood that various modifications may be made without departing from the spirit and scope of the invention. Accordingly, other embodiments are within the scope of the following claims.

What is claimed is:

1. An apparatus for cladding an interior surface of a curved pipe, the apparatus comprising:
   a pipe support having a pipe support rotational axis, said pipe support configured to hold the curved pipe for conjoint rotation therewith about said pipe support rotational axis;
   a track assembly including a flexible track section and track mounts;
   said flexible track section secured to opposite ends of the curved pipe by said track mounts and said flexible track section disposed longitudinally along the interior surface of the curved pipe with said flexible track section in tension and in engagement with the interior surface of the curved pipe and conformed to a radius of curvature of the interior surface of the curved pipe;
   a crawler engaged with said flexible track section and movable along said flexible track section;
   an arm supported by said crawler;
   an applicator mount rotatably attached to said arm for rotation about an applicator mount rotational axis, said applicator mount configured to removably hold a material applicator for conjoint rotation therewith;
   a crawler drive operable to move said crawler along said flexible track;
   an applicator mount drive operable to rotate said applicator mount about said applicator mount rotational axis; and
   a pipe support drive operable to rotate said pipe support about said pipe support rotational axis.

2. The apparatus of claim 1, further comprising:
   a lateral adjuster connected to said arm and configured to adjust the lateral position of said arm with respect to said crawler; and
   a vertical adjuster connected to said arm and configured to adjust the vertical position of said arm with respect to said crawler.

3. The apparatus of claim 1, wherein each of said track mounts include a hydraulic ram.

4. The apparatus of claim 1, wherein each of said track mounts includes a torsion rod.

5. The apparatus of claim 1, wherein said cable support includes a suspension wheel mounted to an end of the pipe.

6. The apparatus of claim 1, wherein said flexible track section is a length of sheet metal; and
   said crawler includes two track guides on each side of said crawler that are engaged with side edges of said length of sheet metal, said crawler being supported for movement along said flexible track by the engagement between said track guides and said length of sheet metal.

7. The apparatus of claim 6, wherein said flexible track section is comprised of a single continuous length of said sheet metal.

8. The apparatus of claim 1, further comprising:
   a controller;
   a pair of forward/reverse switches;
   level position sensors; and
   said controller in communication with said level position sensors and said pair of forward/reverse switches.

* * * * *